United States Patent
Arnault et al.

(10) Patent No.: US 11,454,310 B2
(45) Date of Patent: Sep. 27, 2022

(54) PULLEY DEVICE, IN PARTICULAR FOR TENSIONING IDLER OR RUNNER ROLLER

(71) Applicant: AKTIEBOLAGET SKF, Gothenburg (SE)

(72) Inventors: Benoit Arnault, Saint-Cyr-sur-Loire (FR); Mickael Chollet, Joué-lès-Tours (FR); Benoît Hauvespre, Saint Etienne de Chigny (FR); Nicolas Tronquoy, Fondettes (FR)

(73) Assignee: AKTIEBOLAGET SKF, Gothenburg (SE)

( * ) Notice: Subject to any disclaimer, the term of this patent is extended or adjusted under 35 U.S.C. 154(b) by 115 days.

(21) Appl. No.: 16/738,601

(22) Filed: Jan. 9, 2020

(65) Prior Publication Data

US 2020/0256447 A1  Aug. 13, 2020

(30) Foreign Application Priority Data

Feb. 11, 2019  (DE) .......................... 102019201753.3

(51) Int. Cl.
*F16H 55/46* (2006.01)
*F16H 7/18* (2006.01)
(Continued)

(52) U.S. Cl.
CPC .......... *F16H 55/46* (2013.01); *F16H 7/1254* (2013.01); *F16H 7/18* (2013.01); *F16H 2007/0865* (2013.01)

(58) Field of Classification Search
CPC .......... F16H 55/36; F16H 55/46; F16H 55/42; F16H 55/44; F16H 55/48; F16H 55/56;
(Continued)

(56) References Cited

U.S. PATENT DOCUMENTS

| 859,099 A | * | 7/1907 | Nice | ............... F16H 2007/0865 |
| | | | | 474/199 |
| 3,367,199 A | * | 2/1968 | Dankowski | ............. F16H 55/42 |
| | | | | 474/199 |

(Continued)

FOREIGN PATENT DOCUMENTS

| DE | 202005011230 U1 | 9/2005 |
| DE | 102017223317 A1 | 6/2019 |

(Continued)

*Primary Examiner* — Michael R Mansen
*Assistant Examiner* — Raveen J Dias
(74) *Attorney, Agent, or Firm* — J-Tek Law PLLC; Scott T. Wakeman; Mark A. Ussai

(57) ABSTRACT

A pulley device for supporting a belt of chain tensioning idler or a runner roller includes a bearing having an outer ring mounted for rotation relative to a coaxial inner ring and at least one pulley part that is C-shaped in cross section. The pulley part has an inner portion with a frustoconical inner surface mounted on an outer cylindrical surface of the outer ring, an outer cylindrical portion having an outer cylindrical surface configured to support a belt or a chain, and an intermediate portion extending radially inward from the cylindrical outer portion to the inner portion. The pulley part is integral and has an open end on an axial side opposite the intermediate portion. The frustoconical surface extends inwardly towards the outer ring, and the inner surface is force fitted onto the outer cylindrical surface of the outer ring.

16 Claims, 7 Drawing Sheets

(51) Int. Cl.
*F16H 7/12* (2006.01)
*F16H 7/08* (2006.01)

(58) Field of Classification Search
CPC ............ F16H 55/566; F16H 7/12; F16H 7/14; F16H 7/16; F16H 7/18; F16H 7/1254; F16H 2007/185; F16H 2007/0865
USPC .................................................. 474/198, 199
See application file for complete search history.

(56) References Cited

U.S. PATENT DOCUMENTS

| | | | | |
|---|---|---|---|---|
| 3,490,285 A * | 1/1970 | Walter | ........................ | F16H 7/12 474/187 |
| 3,771,843 A * | 11/1973 | Clasper | ................... | B62D 55/14 474/187 |
| 3,789,683 A * | 2/1974 | Frost | ........................ | F16H 55/44 474/181 |
| 3,822,457 A * | 7/1974 | Frost | ........................ | F16H 55/44 29/892.11 |
| 3,842,475 A * | 10/1974 | Clasper | ................... | B21D 53/26 29/892.11 |
| 3,844,010 A * | 10/1974 | Frost | ........................ | F16C 33/80 29/898.07 |
| 3,915,511 A * | 10/1975 | Clasper | ..................... | B60B 3/08 474/187 |
| 3,926,485 A * | 12/1975 | Frost | .................... | F16C 33/7886 384/510 |
| 4,059,023 A * | 11/1977 | Sproul | ..................... | F16H 55/44 474/170 |
| 4,073,551 A * | 2/1978 | Sutowski | ............... | F16C 13/006 384/501 |
| 4,443,210 A * | 4/1984 | Olschewski | ........... | F16H 7/1281 474/112 |
| 4,457,740 A * | 7/1984 | Olschewski | ........... | F16C 13/006 474/112 |
| 4,468,210 A * | 8/1984 | McCutchan, Jr. | ....... | F16H 55/44 474/170 |
| 4,518,372 A * | 5/1985 | Dye | ...................... | F16C 13/006 474/199 |
| 4,534,749 A * | 8/1985 | Hans | ..................... | F16C 13/006 474/174 |
| 4,571,226 A * | 2/1986 | Molloy | .................... | F16H 7/12 474/190 |
| 4,591,352 A * | 5/1986 | Olschewski | ........... | F16C 13/006 384/505 |
| 4,799,909 A * | 1/1989 | Kanemitsu | ............ | B21D 53/261 474/168 |
| 4,822,111 A * | 4/1989 | Albert | ...................... | B60B 3/002 301/105.1 |
| 4,831,705 A * | 5/1989 | Kanemitsu | ........... | B21D 53/261 29/892.11 |
| 5,725,448 A * | 3/1998 | Kato | ..................... | F16C 13/006 384/510 |
| 5,728,020 A * | 3/1998 | Muranaka | ............. | C10M 115/08 474/199 |
| 6,102,822 A * | 8/2000 | Nakazeki | ............. | F16C 13/006 384/523 |
| 6,196,720 B1 * | 3/2001 | Nozaki | ................. | C10M 107/02 384/13 |
| 6,270,001 B1 * | 8/2001 | Tadic | .................... | B23K 31/02 228/245 |
| 6,357,926 B1 * | 3/2002 | Hauck | ................... | F16C 13/006 384/546 |
| 6,605,574 B2 * | 8/2003 | Asao | ..................... | F16C 13/006 508/376 |
| 10,228,051 B2 * | 3/2019 | Basile | ................... | F16H 55/566 |
| 2001/0016529 A1 * | 8/2001 | Kawachi | ................ | F16H 55/36 474/94 |
| 2002/0086754 A1 * | 7/2002 | Fukuwaka | ............ | F16C 33/416 474/199 |
| 2004/0178398 A1 * | 9/2004 | Miller | ..................... | F16H 55/44 254/390 |
| 2004/0235599 A1 * | 11/2004 | Ozorak | .................. | F16C 25/08 474/199 |
| 2005/0261092 A1 * | 11/2005 | Ochiai | .................. | F16D 41/066 474/70 |
| 2008/0220921 A1 * | 9/2008 | Yanai | .................... | F16C 13/006 474/199 |
| 2008/0230341 A1 * | 9/2008 | Barraud | ................ | F16D 41/069 192/41 A |
| 2008/0268995 A1 * | 10/2008 | Sakamoto | ................ | F16D 9/06 474/199 |
| 2008/0287236 A1 * | 11/2008 | Yamaguchi | ............. | F16H 55/36 474/170 |
| 2008/0300077 A1 * | 12/2008 | Kapfer | .................. | F16C 13/006 474/133 |
| 2009/0191999 A1 * | 7/2009 | Joseph | .................... | F16H 55/36 474/199 |
| 2009/0298630 A1 * | 12/2009 | Mineno | ................. | F16C 35/063 474/199 |
| 2011/0111900 A1 * | 5/2011 | Wilson | ...................... | F16H 7/20 474/166 |
| 2014/0031157 A1 * | 1/2014 | Takano | ................. | F16C 35/063 474/135 |
| 2016/0017978 A1 * | 1/2016 | Koda | ...................... | F16H 55/44 474/166 |
| 2019/0186612 A1 | 6/2019 | Benoit | | |
| 2019/0323594 A1 * | 10/2019 | Arnault | ................. | F16C 19/18 |
| 2019/0390756 A1 * | 12/2019 | Arnault | ................. | F16H 57/035 |
| 2020/0124143 A1 * | 4/2020 | Hodjat | ...................... | F16H 7/02 |
| 2020/0191251 A1 * | 6/2020 | Arnault | ................. | F16C 33/78 |
| 2020/0200221 A1 * | 6/2020 | Inoue | ................... | F16C 33/78 |
| 2020/0256378 A1 * | 8/2020 | Hauvespre | ............. | F16H 7/20 |
| 2020/0256448 A1 * | 8/2020 | Chollet | ................... | F16H 55/46 |
| 2020/0256449 A1 * | 8/2020 | Hauvespre | ............. | F16C 33/586 |
| 2020/0263766 A1 * | 8/2020 | Arnault | ................. | F16H 55/44 |
| 2020/0263776 A1 * | 8/2020 | Arnault | ................. | F16H 7/1254 |
| 2020/0263777 A1 * | 8/2020 | Arnault | ................. | F16H 7/1254 |
| 2020/0386304 A1 * | 12/2020 | Arnault | ................. | F16H 55/44 |

FOREIGN PATENT DOCUMENTS

| | | | | |
|---|---|---|---|---|
| GB | 190509598 A | 5/1906 | | |
| GB | 141829 A | 4/1920 | | |
| WO | WO-2006092187 A1 * | 9/2006 | ............ | F16C 13/006 |
| WO | WO-2007101771 A1 * | 9/2007 | ............ | F16H 55/44 |

* cited by examiner

PULLEY DEVICE, IN PARTICULAR FOR TENSIONING IDLER OR RUNNER ROLLER

CROSS REFERENCE

This application claims priority to German patent application no. 10 2019 201 753.3 filed Feb. 11, 2019, the contents of which are fully incorporated herein by reference.

TECHNICAL FIELD

The present disclosure is directed to the field of pulley devices for tensioning idlers or runner rollers designed to interact with a chain or a belt, for example a distribution belt of an internal combustion engine of a vehicle.

BACKGROUND

Such rollers are usually used to keep a tension on the belt or chain constant or in a determined range or to locally modify the path taken by the chain or belt. These are called respectively tensioning idlers or runner rollers. In runner rollers, the pulley is mounted so as to rotate on a screw or a spindle by means of a rolling bearing, the roller then being attached directly or indirectly to the engine block or to an element of a tensioning idler device, for example an articulated arm or an eccentric.

Document GB 190509598 discloses a pulley comprising male and female overlapping parts which are in an interlocking relation and form a cylindrical outer portion intended to be in contact with a belt.

A major disadvantage of this pulley is that an annular recess is formed on the outer portion adapted to support the belt when the male and female parts are fastened together. There is therefore a risk of an early wear of the belt.

It is also known by document GB 141 829 a pulley comprising a peripheral part intended to be in contact with a belt, an inner part and a intermediate part between the inner and outer parts. The pulley is tightened to the outer ring of bearing, but said pulley can slightly axially move during the service use of pulley device. Moreover, with such a pulley, the outer part may be deformed radially inwards by bending under the action of the belt.

It has been proposed in document DE 202005011230 U1 to house a damping ring within a C-shaped pulley, said damping element being configured to damp vibrations from the belt and being suitable to limit radial inward deformation of outer portion of said pulley. However, the pulley can still be deformed under heavy loads.

SUMMARY

The aim of the disclosure is to overcome these drawbacks by proposing a pulley which is easy to install onto a bearing, of good rigidity, adapted to avoid an early wear of the belt, and permitting an efficient support of said belt.

To this end, the disclosure relates to a pulley device suitable for a belt of chain tensioning idler or runner roller, comprising a bearing and a pulley.

The bearing comprises a rotatable outer ring and a fixed inner ring, said rings being coaxial.

The pulley comprises at least one pulley part having in cross section an overall shape of a C, and having an inner portion with an inner surface mounted on an outer cylindrical surface of outer ring of bearing, an outer cylindrical portion having an outer cylindrical surface intended to be in contact with the belt or the chain, and a radial intermediate portion extending substantially radially between axial ends of inner and outer portions on one axial side of pulley device, the pulley part being formed integral and defining an open end on one axial side opposite to the intermediate portion.

According to the disclosure, the inner portion of said pulley part comprises a frustoconical portion inwardly directed towards the outer ring, said inner portion being force fitted (friction fitted) onto outer cylindrical surface of said outer ring.

According to further aspects of the disclosure which are advantageous but not compulsory, such a pulley device may incorporate one or several of the following features:

The bearing is a rolling bearing, at least one row of rolling elements being radially interposed between the inner ring and the outer ring.

The rolling elements are balls.

The rolling elements are equally circumferentially spaced and maintained by an annular cage.

The pulley is formed by only one pulley part.

The pulley comprises two C-shaped pulley parts mounted onto the outer cylindrical surface of outer ring of bearing, open ends of said pulley parts axially facing each other, free ends of outer portions of pulley parts being in axial abutment.

The two pulley parts are symmetrical with respect to a transverse radial plane passing through the centre of the bearing.

The outer portion of pulley part is of greater axial length than that of the inner portion, said outer portion protruding axially on at least one axial side of the inner portion.

The pulley part is made from a stamped metal sheet or blank.

The inner portion of pulley is entirely frustoconical.

The outer cylindrical surface of outer ring of bearing is provided with at least one recess having in cross section a concave internal profile. The two pulley parts are each provided with at least one protruding portion which inwardly extends from end of inner portion and is received in a corresponding recess of outer ring so as to block pulley part with respect to the outer ring in both axial directions.

The recess provided to the outer cylindrical surface of outer ring of bearing is centered on a transverse radial plane passing through the centre of the bearing The recess provided to the outer cylindrical surface of outer ring of bearing is an annular groove.

The pulley parts comprise each a plurality of circumferentially spaced protruding portions, each being received by a corresponding recess of outer ring.

The protruding portions of pulley parts are annular.

BRIEF DESCRIPTION OF THE DRAWINGS

The disclosure will now be explained in correspondence with the annexed figures, as illustrative examples, without restricting the invention. In the annexed figures.

DETAILED DESCRIPTION

Figure 1:
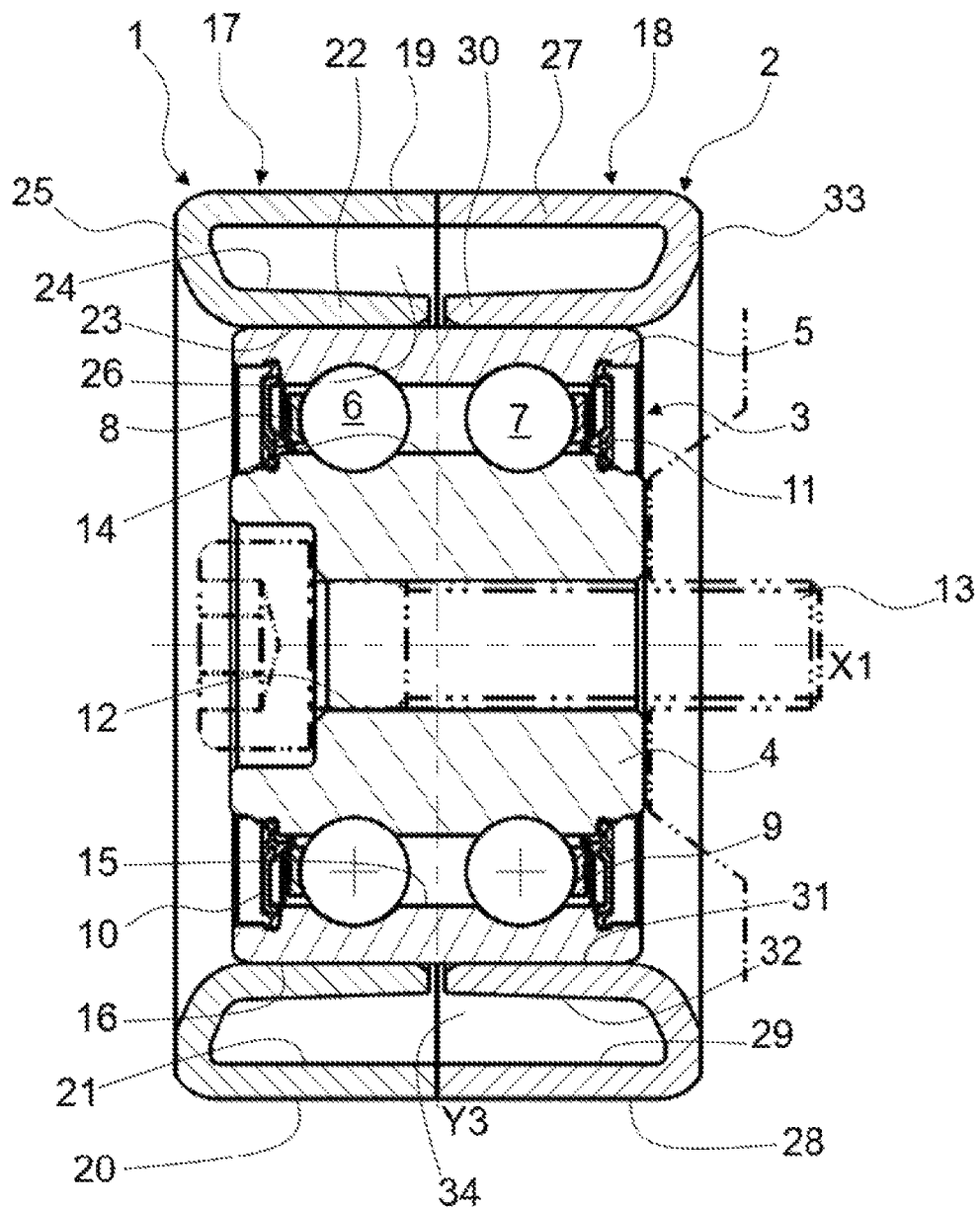
FIG. 1 is an axial section of a pulley device according to a first embodiment of the invention.
Figure 2:
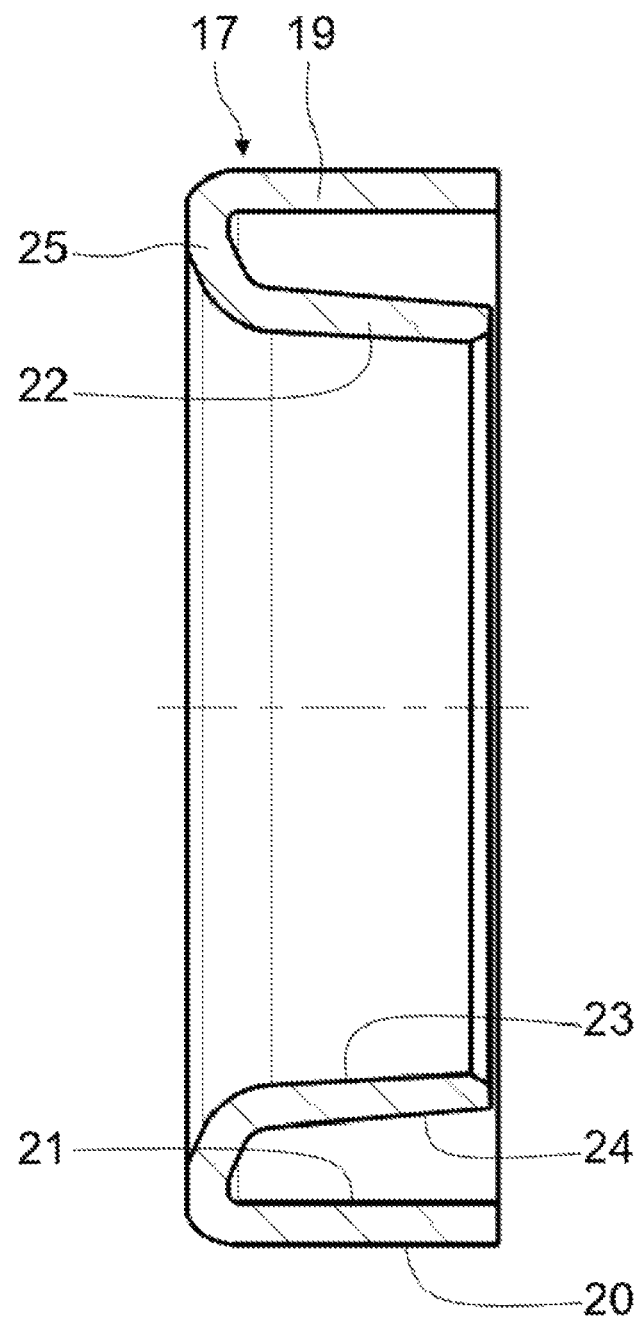
FIG. 2 is an axial section of one pulley part provided to the pulley device of FIG. 1.
Figure 3:
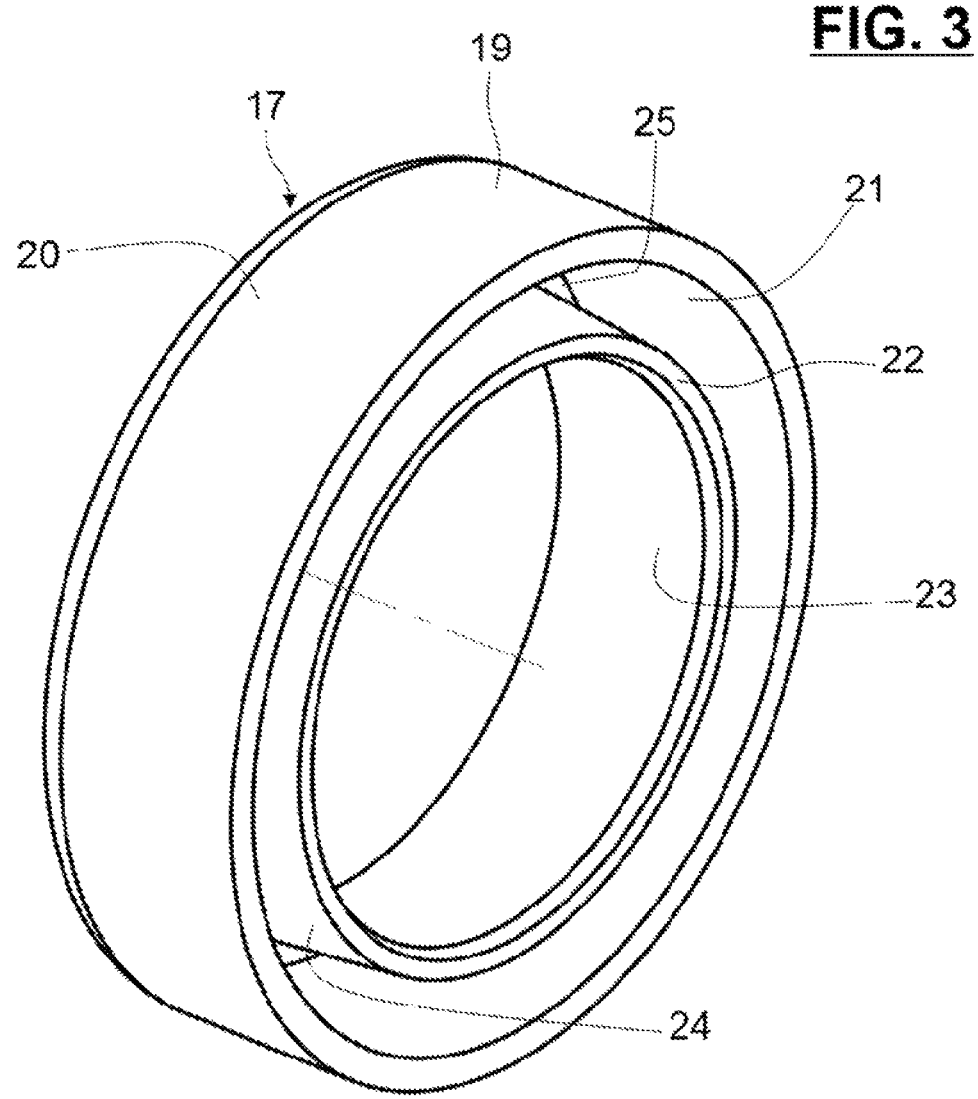
FIG. 3 is a perspective view of the pulley part of FIG. 2.
Figure 4:
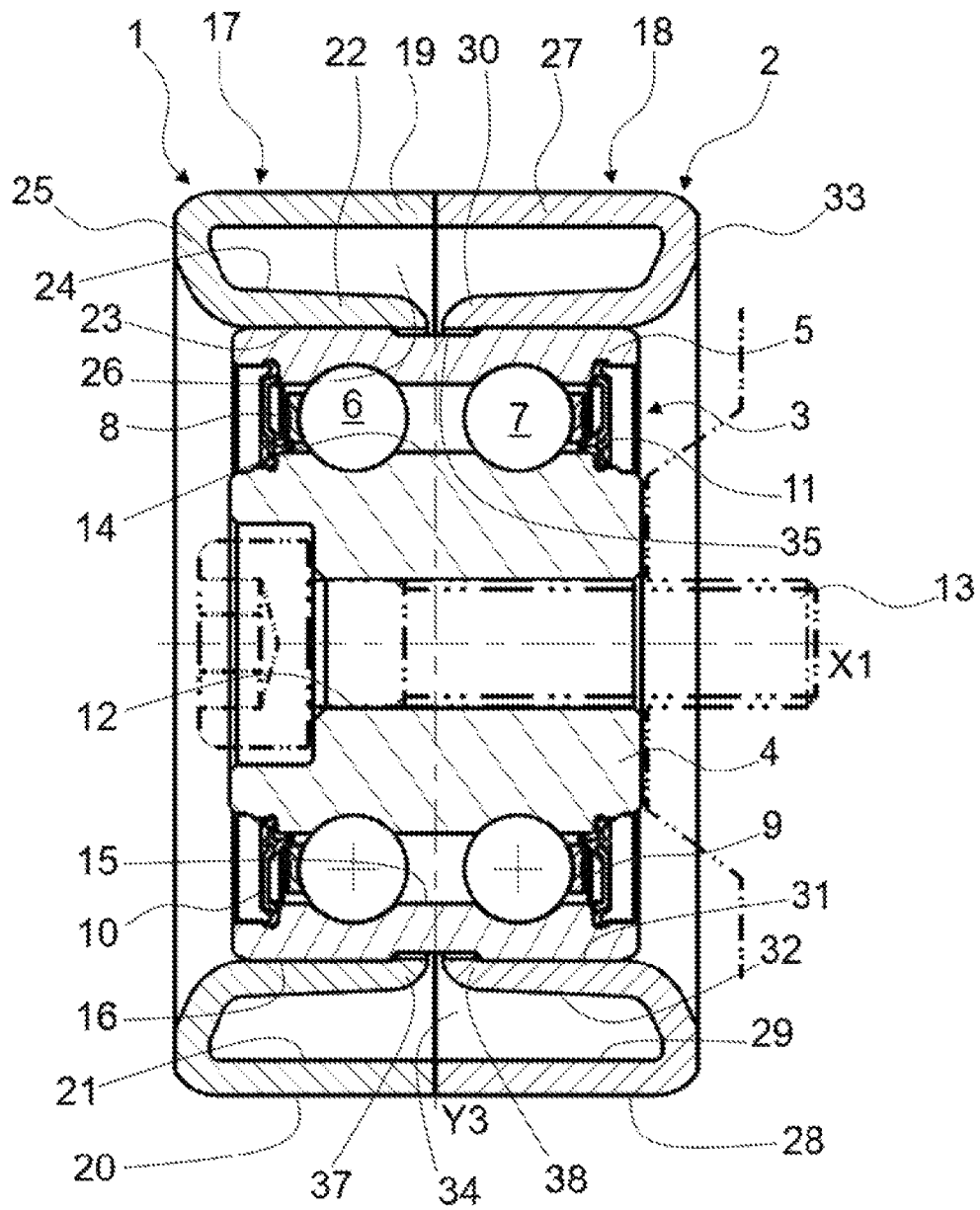
FIG. 4 is an axial section of a pulley device according to a second embodiment of the invention.
Figure 5:
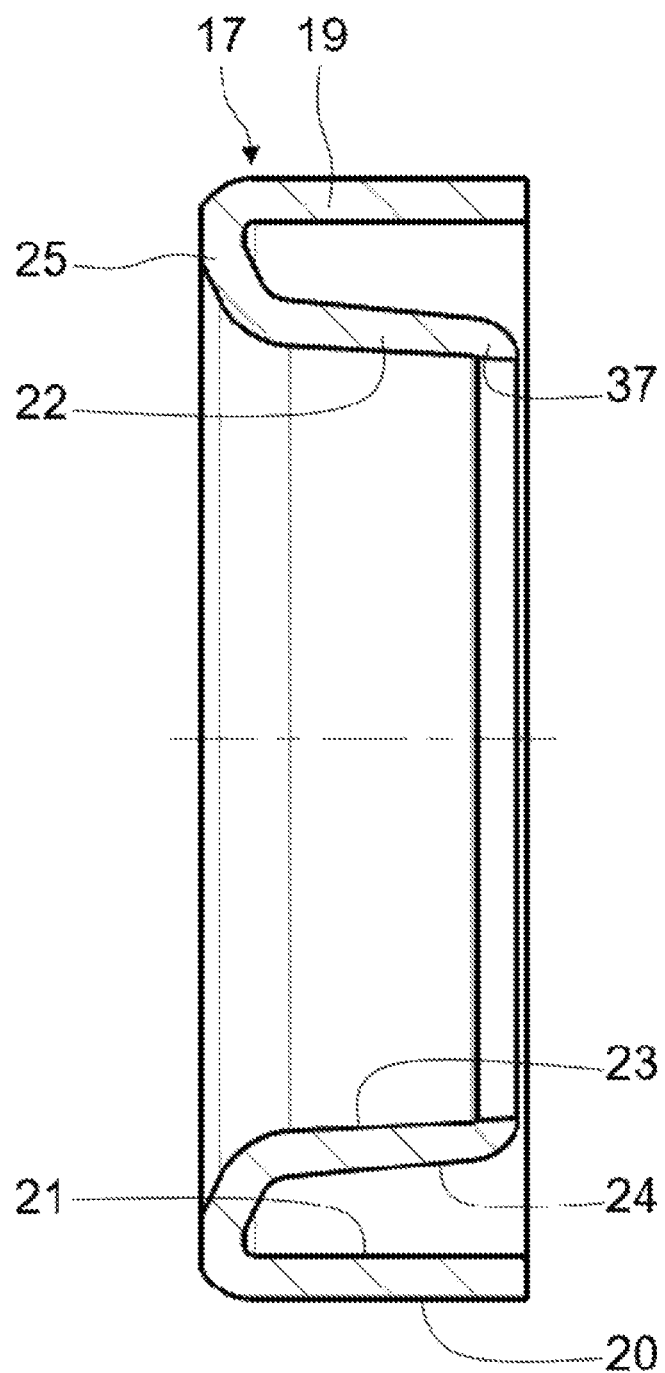
FIG. 5 is an axial section of one pulley part provided to the pulley device of FIG. 4.
Figure 6:
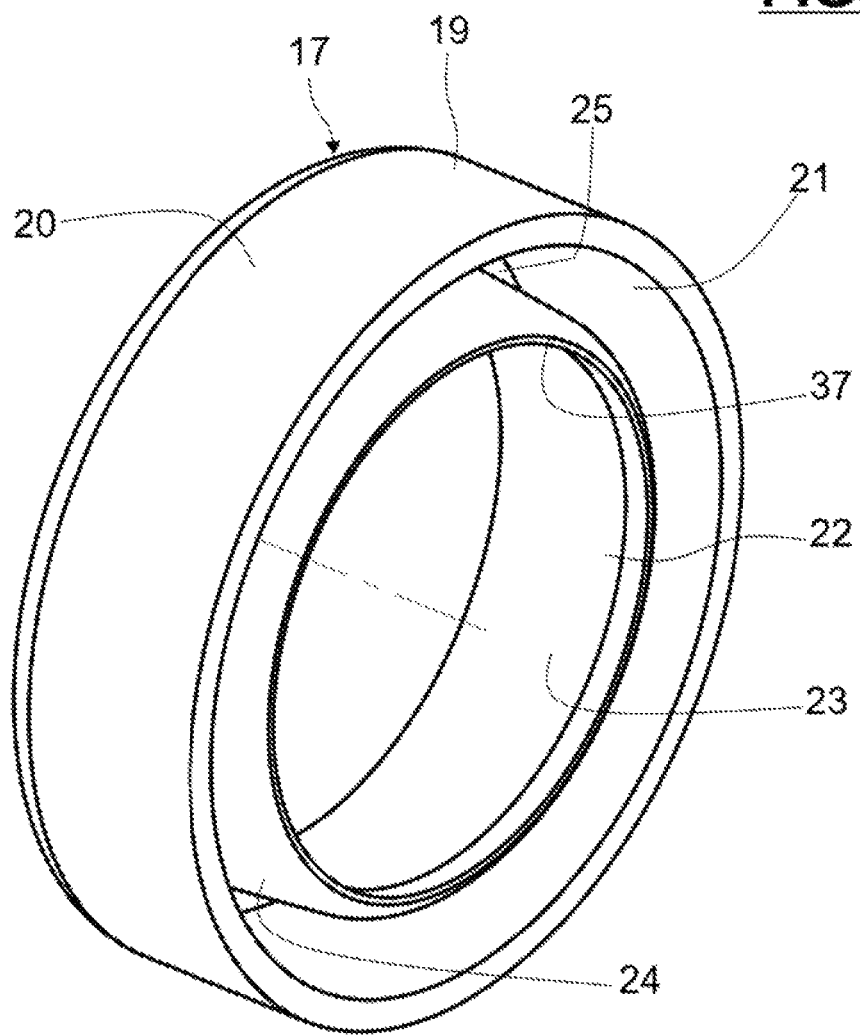
FIG. 6 is a perspective view of the pulley part of FIG. 5.
Figure 7:
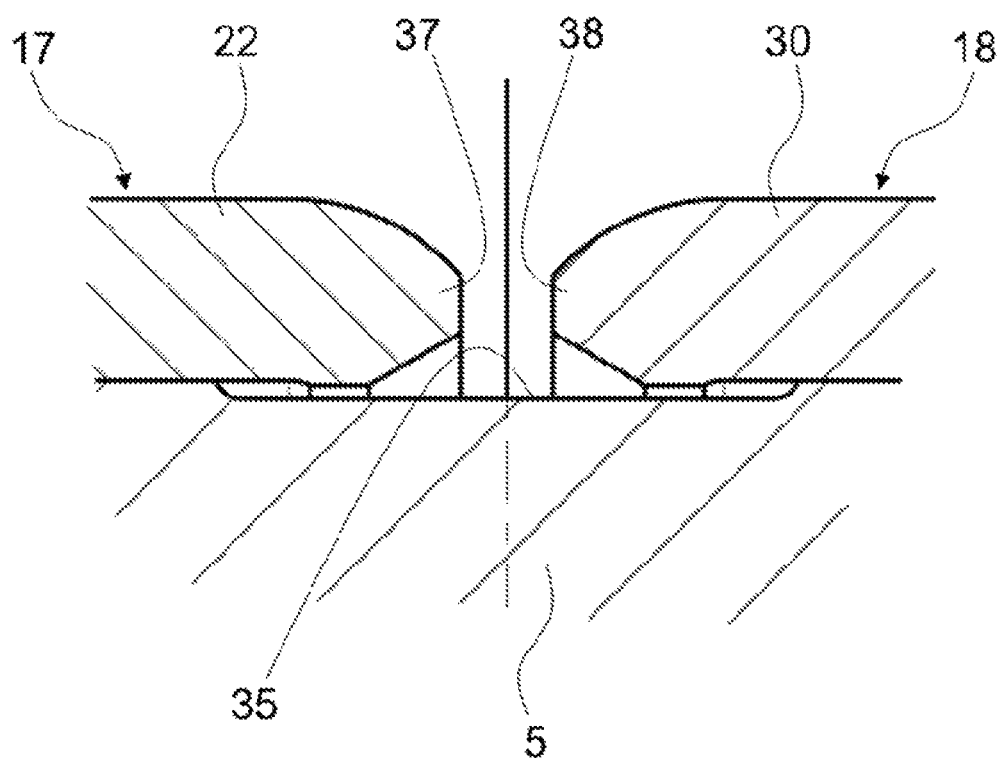
FIG. 7 is a detailed view of the pulley device of FIG. 4.

The pulley device 1 as illustrated in FIGS. 1 to 3 is suitable for a belt or chain tensioning idler or runner roller, and comprises a pulley 2 adapted to interact with a belt or chain (not shown) and a rolling bearing 3 with a geometric axis X1.

The rolling bearing comprises a fixed inner ring 4 and a rotatable outer ring 5 between which are housed two rows of rolling elements 6 and 7, which in this case are balls, two annular cages 8, 9 respectively maintaining the circumferential spacing of said rolling elements 6, 7, and two annular seals 10, 11.

The inner ring 4 and the outer ring 5 are concentric and symmetric with respect to a transverse radial plane Y3 passing through the centre of the rolling bearing 3. The rings 4, 5 are advantageously of solid type. A solid type is to be understood as a ring obtained by machining with removal of material, by machining, grinding, from a metal tube stock, bar stock, rough forgings and/or rolled blanks.

The inner ring 4 comprises a bore 12 configured to receive a fastening screw 13 (in dotted line) to fasten the device 1 on an external support. The inner ring further comprises an outer cylindrical surface 14 onto which toroidal circular raceways are formed, said raceways having in cross section a concave internal profile adapted to the rolling elements 6, 7.

The outer ring 5 comprises a cylindrical bore 15 onto which toroidal circular raceways are formed, said raceways having in cross section a concave internal profile adapted to receive the rolling elements 6, 7. The outer ring 5 further comprises an outer cylindrical surface 16.

The pulley 2 has two pulley parts 17, 18, both having in cross section an overall shape of a C.

The first pulley part 17 comprises an axial annular outer portion 19 providing a cylindrical outer surface 20 designed to interact with a portion of the belt of the chain, and a cylindrical inner surface or bore 21.

The first pulley part 17 also comprises an axial annular inner portion 22 providing an inner surface or bore 23 into which the outer cylindrical surface 16 of outer ring 5 of bearing 3 is mounted, and an outer surface 24.

The outer portion 19 is of larger diameter than that of the inner portion 22, said outer portion 19 radially surrounding the inner portion 22. Advantageously, the outer portion 19 is of greater axial length than that of the inner portion 22, said outer portion 19 protruding axially on at least one axial side of the inner portion 22.

The first pulley part 17 further comprises an annular radial intermediate portion 25 extending substantially radially between axial ends of inner and outer portions 22, 19 on a first axial side of pulley device 1.

The first pulley part 17 then has in cross section an overall shape of a C, defining an open end 26 on one axial side of the pulley device 1. The first pulley part 17 is formed integral.

The second pulley part 18 comprises an axial annular outer portion 27 providing a cylindrical outer surface 28 designed to interact with a portion the belt of the chain, and a cylindrical inner surface or bore 29.

The second pulley part 18 also comprises an axial annular inner portion 30 providing an inner surface or bore 31 into which the outer cylindrical surface 16 of outer ring 5 of bearing 3 is mounted, and an outer surface 32.

The outer portion 27 is of larger diameter than that of the inner portion 30, said outer portion 27 radially surrounding the inner portion 30. Advantageously, the outer portion 27 is of greater axial length than that of the inner portion 30, said outer portion 27 protruding axially on at least one axial side of the inner portion 30.

The second pulley part 18 further comprises an annular radial intermediate portion 33 extending substantially radially between axial ends of inner and outer portions 30, 27 on a second axial side of pulley device 1, said second axial side being axially opposite to the first axial side.

The second pulley part 18 then has in cross section an overall shape of a C, defining an open end 34 on one axial side of the pulley device 1. The second pulley part 18 is formed integral.

Advantageously, the pulley parts 17, 18 are both made of thin metal sheet or blank by folding, cutting and stamping.

Advantageously, the two C-shaped pulley parts 17, 18 are symmetrical with each other with respect to the radial plane Y3. The free ends of outer portions 19, 27 of first and second pulley parts 17, 18 respectively come into contact in an axial direction, the open ends 26, 34 respectively being axially open to each other. The two outer cylindrical surfaces 20, 28 form a surface configured to interact with the belt or the chain. The pulley 2 formed by the two pulley parts 17, 18 arranged in axial contact with each other is suitable for guiding, supporting the belt of the chain with an efficient manner.

According to the invention, the inner portion 22 of first pulley part 17 and the inner portion 30 of second pulley part 18 are both frustoconical. Portions 22 and 30 are both inclined and downwardly extend towards the outer ring 5 of bearing 3.

The frustoconical inner surfaces 23, 31 of inner portions 22 and 30 are mounted with interference fit onto the outer cylindrical surface 16 of outer ring 5. Thanks to their frustoconical shape, the interference fit is even more strong compared to inner portions of cylindrical shape force fitted onto the outer ring 5. Moreover, the sharp free edges of said frustoconical inner portions 22, 30 can slightly dig into the outer ring material and then improve the mechanical retention of pulley parts with respect to outer ring 5.

The two parts 17, 18 of pulley 2 are then axially blocked in both axial direction with respect to the outer ring 5 of bearing 3. Even in case of heavy vibrations or shocks, the pulley 2 is prevented for axial movement and is suitable to efficiently support the belt of the chain for an increased and efficient service life.

According to a second embodiment of the invention illustrated in FIGS. 4 to 7, the outer cylindrical surface 16 of outer ring 5 of bearing 3 is provided with an annular groove 35. The groove 35 is centered on the transverse radial plane Y3 passing through the centre of the bearing 3.

Each of the pulley parts 17, 18 of pulley 2 further comprises a protruding portion 37, 38, respectively. More precisely:

The inner annular portion 22 of first pulley part 17 comprises a free edge with a portion 37 which is radially inwardly bent towards the outer ring 5 of bearing 3. The bent portion 37 is received by the annular groove 35 of said outer ring 5.

Similarly and symmetrically, the inner annular portion 30 of second pulley part 18 comprises a free edge with a portion 38 which is radially inwardly bent towards the outer ring 5 of bearing 3. The bent edge 38 is also received by the annular groove 35 of said outer ring 5.

The two bent portions 37, 38 are axially facing each other with respect to the central radial plane Y3, and are both received in the same groove 35 of outer ring 5.

The bent portions 37, 38 are annular. Alternatively, the inner portions 22, 30 of pulley parts 17, 18 each comprise a plurality of bent and circumferentially spaced portions.

Representative, non-limiting examples of the present invention were described above in details with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved pulley device.

Moreover, various features of the above-described representative examples, as well as the various independent and dependent claims below, may be combined in ways that are not specifically and explicitly enumerated in order to provide additional useful embodiments of the present teachings.

What is claimed is:

1. A pulley device for supporting a belt of a chain tensioning idler or a runner roller, the pulley device being formed by force fitting at least one pulley part onto a cylindrical outer surface of a bearing outer ring mountable for rotation relative to a coaxial bearing inner ring;
the at least one pulley part, prior to the force fitting, being C-shaped in cross section and having an inner portion with a frustoconical radially inner surface, an outer cylindrical portion having an outer cylindrical surface configured to support a belt or a chain, and an intermediate portion extending radially inward from the outer cylindrical portion to the inner portion, the at least one pulley part being formed integral and having an open end on an axial side opposite the intermediate portion.

2. The pulley device according to claim 1, wherein the at least one pulley part comprises no more than one pulley part.

3. The pulley device according to claim 1, wherein the at least one pulley part comprises a first pulley part and a second pulley part mounted on the cylindrical outer surface of the bearing outer ring such that the open end of the first pulley part faces the open end of the second pulley part and such that a free end of the outer cylindrical portion of the first pulley part abuts a free end of the outer cylindrical portion of the second pulley part.

4. The pulley device according to claim 3, wherein the first and second pulley parts are symmetrical with respect to a transverse radial plane passing through a center of the bearing outer ring.

5. The pulley device according to claim 3, wherein:
the cylindrical outer surface of the bearing outer ring is provided with at least one recess, and
the first and second pulley parts each have at least one protruding portion which extends radially inward from an end of the inner portion and is received in the at least one recess of the bearing outer ring so as to block axial movement of the first and second pulley parts relative to the bearing outer ring.

6. The pulley device according to claim 5, wherein the at least one recess is axially centered on a transverse radial plane.

7. The pulley device according to claim 6, wherein the at least one recess is an annular groove.

8. The pulley device according to claim 5, wherein the protruding portions are annular.

9. The pulley device according to claim 5,
wherein the at least one recess comprises a first recess;
wherein the at least one protruding portions of the first and second pulley parts comprise a first protruding portion on the first pulley part and a second protruding portion on the second pulley part, and
wherein the first and second protruding portions extend into the first recess.

10. The pulley device according to claim 1, wherein the inner portion of at least one pulley part is entirely frustoconical.

11. A pulley device for supporting a belt of chain tensioning idler or a runner roller, the pulley device comprising:
a bearing having an outer ring mounted for rotation relative to a coaxial inner ring; and
at least one pulley part, C-shaped in cross section, having an inner portion with a frustoconical inner surface mounted on an outer cylindrical surface of the outer ring, an outer cylindrical portion having an outer cylindrical surface configured to support a belt or a chain, and an intermediate portion extending radially inward from the outer cylindrical portion to the inner portion, the at least one pulley part being formed integral and having an open end on an axial side opposite the intermediate portion;
wherein the frustoconical inner surface extends inwardly towards the outer ring, and
wherein the frustoconical inner surface is force fitted onto the outer cylindrical surface of the outer ring,
wherein the at least one pulley part comprises a first pulley part and a second pulley part, the first and second pulley parts being mounted on the outer cylindrical surface of the outer ring such that the open end of the first pulley part faces the open end of the second pulley part and such that a free end of the outer cylindrical portion of the first pulley part abuts a free end of the outer cylindrical portion of the second pulley part,
wherein the outer cylindrical surface of the outer ring includes an annular recess,
wherein the first and second pulley parts each have at least one protruding portion which extends radially inward from an end of the inner portion and is received in the annular recess of the outer ring.

12. A method of forming a pulley device, comprising:
providing at least one pulley part, C-shaped in cross section, having an inner portion with a frustoconical radially inner surface, an outer cylindrical portion having an outer cylindrical surface configured to support a belt or a chain, and an intermediate portion extending radially inward from the outer cylindrical portion to the inner portion, the at least one pulley part being formed integral and having an open end on an axial side opposite the intermediate portion, and
force fitting the at least one pulley part on a cylindrical outer surface of a bearing outer ring, the bearing outer ring being mountable for rotation relative to a coaxial inner ring.

13. The method according to claim 12,
wherein the at least one pulley part comprises no more than one pulley part.

14. The method according to claim 12,
wherein the at least one pulley part comprises a first pulley part and a second pulley part,
wherein force fitting the at least one pulley part comprises force fitting the first pulley part on the cylindrical outer surface and force fitting the second pulley part on the cylindrical outer surface such that an open end of the first pulley part faces an open end of the second pulley part and such that a free end of the outer cylindrical portion of the first pulley part abuts a free end of the outer cylindrical portion of the second pulley part.

15. The method according to claim 14,
wherein the cylindrical outer surface includes at least one recess, and
wherein the method includes biasing a free end of the inner portion of the first pulley part into the at least one recess and biasing a free end of the inner portion of the second pulley part into the at least one recess.

16. The method according to claim 15,
wherein the at least one recess is an annular groove.

\* \* \* \* \*